United States Patent
Mandal et al.

(10) Patent No.: US 10,795,658 B2
(45) Date of Patent: Oct. 6, 2020

(54) UPDATABLE RANDOM FUNCTIONS

(71) Applicant: FUJITSU LIMITED, Kawasaki-shi, Kanagawa (JP)

(72) Inventors: Avradip Mandal, Sunnyvale, CA (US); Arnab Roy, Santa Clara, CA (US); Hart Montgomery, Redwood City, CA (US)

(73) Assignee: FUJITSU LIMITED, Kawasaki (JP)

( * ) Notice: Subject to any disclaimer, the term of this patent is extended or adjusted under 35 U.S.C. 154(b) by 62 days.

(21) Appl. No.: 15/464,239

(22) Filed: Mar. 20, 2017

(65) Prior Publication Data

US 2018/0267789 A1 Sep. 20, 2018

(51) Int. Cl.
| H04L 9/08 | (2006.01) |
| G06F 8/65 | (2018.01) |
| G06F 7/58 | (2006.01) |
| G06Q 20/38 | (2012.01) |
| H04L 9/32 | (2006.01) |
| H04L 9/16 | (2006.01) |

(52) U.S. Cl.
CPC .......... *G06F 8/65* (2013.01); *G06F 7/582* (2013.01); *G06Q 20/3829* (2013.01); *H04L 9/0869* (2013.01); *H04L 9/0891* (2013.01); *H04L 9/16* (2013.01); *H04L 9/32* (2013.01); *H04L 2209/56* (2013.01)

(58) Field of Classification Search
CPC .................................................. G06F 8/65
USPC ...................................................... 717/171
See application file for complete search history.

(56) References Cited

U.S. PATENT DOCUMENTS

| 6,151,676 A * | 11/2000 | Cuccia ............... H04L 9/3013 380/259 |
| 6,628,786 B1 | 9/2003 | Dole |
| 6,804,355 B1 * | 10/2004 | Graunke ............. H04L 9/0625 380/37 |
| 8,094,823 B1 | 1/2012 | Sun et al. |
| 9,992,190 B2 * | 6/2018 | Kikuchi ............... H04L 9/085 |
| 2004/0098589 A1 * | 5/2004 | Appenzeller ........ H04L 9/3073 713/170 |
| 2006/0104443 A1 | 5/2006 | Chari et al. |
| 2007/0106892 A1 * | 5/2007 | Engberg ........... H04L 63/0853 713/168 |

(Continued)

OTHER PUBLICATIONS

Kiayias, Aggelos, et al. "A Provably Secure Proof-of-Stake Blockchain Protocol." IACR Cryptology ePrint Archive 2016 (2016): 889. (Year: 2016).*

(Continued)

*Primary Examiner* — James D. Rutten
(74) *Attorney, Agent, or Firm* — Maschoff Brennan (57) ABSTRACT

A method may include generating, via a setup function, public parameters associated with a random updatable function. The method may further include generating, via an initialization function and based at least in part on the public parameters generated by the setup function, a first random element and a first state. The method may further include generating, via an update function and based at least in part on the public parameters generated by the setup function, a third random element and a second state. Inputs of the update function may include the first state generated by the initialization function and a second random element.

20 Claims, 6 Drawing Sheets

(56) References Cited

U.S. PATENT DOCUMENTS

| | | | | |
|---|---|---|---|---|
| 2009/0049517 | A1* | 2/2009 | Sorniotti | H04L 9/0844 726/1 |
| 2009/0327735 | A1* | 12/2009 | Feng | H04L 9/0891 713/180 |
| 2012/0002811 | A1* | 1/2012 | Smart | H04L 9/085 380/255 |
| 2013/0262857 | A1* | 10/2013 | Neuman | H04L 63/08 713/155 |
| 2016/0342977 | A1* | 11/2016 | Lam | G06Q 20/02 |
| 2018/0145836 | A1* | 5/2018 | Saur | H04L 9/3252 |
| 2018/0176015 | A1* | 6/2018 | Wang | H04L 9/304 |
| 2018/0191503 | A1* | 7/2018 | Alwar | G06Q 20/065 |

OTHER PUBLICATIONS

E. B. Sasson et al., "Zerocash: Decentralized Anonymous Payments from Bitcoin," 2014 IEEE Symposium on Security and Privacy, San Jose, CA, 2014, pp. 459-474. (Year: 2014).*

Baliga, "Understanding Blockchain Consensus Models", 2017, Persistent Systems, Whitepaper, accessed online at <https://www.persistent.com/wp-content/uploads/2017/04/WP-Understanding-Blockchain-Consensus-Models.pdf> (Year: 2017).*

Rackoff, Charles, and Daniel R. Simon. "Non-interactive zero-knowledge proof of knowledge and chosen ciphertext attack." Annual International Cryptology Conference. Springer Berlin Heidelberg, 1991.

Nakamoto, Satoshi. "Bitcoin: A peer-to-peer electronic cash system." (2008).

Canetti, Ran, Oded Goldreich, and Shai Halevi. "The random oracle methodology, revisited." Journal of the ACM (JACM) 51.4 (2004): 557-594.

Boneh, Dan, and Matt Franklin. "Identity-based encryption from the Weil pairing." Annual International Cryptology Conference. Springer Berlin Heidelberg, 2001.

Boyko, Victor, Philip MacKenzie, and Sarvar Patel. "Provably secure password-authenticated key exchange using Diffie-Hellman." International Conference on the Theory and Applications of Cryptographic Techniques. Springer Berlin Heidelberg, 2000.

G. Brassard, D. Chaum, C. Crépeau, "Minimum Disclosure Proofs of Knowledge," Journal of Computer and System Sciences, vol. 37, No. 2, Oct. 1988, pp. 156-189.

Camenisch, Jan, and Anna Lysyanskaya. "An efficient system for non-transferable anonymous credentials with optional anonymity revocation." International Conference on the Theory and Applications of Cryptographic Techniques. Springer Berlin Heidelberg, 2001.

European Search Report in EP application No. 181559740 dated Aug. 6, 2018.

EP Office Action in application No. 18 155 940.2 dated Apr. 12, 2019.

EP Office Action in application No. 18 155 940.2 dated Nov. 14, 2019.

* cited by examiner

UPDATABLE RANDOM FUNCTIONS

FIELD

The embodiments discussed herein are related to updatable random functions.

BACKGROUND

Random functions may generate random outputs, such as random strings of characters. Systems and processes may employ the random outputs for myriad reasons.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include generating, via a setup function, public parameters associated with a random updatable function. The method may further include generating, via an initialization function and based at least in part on the public parameters generated by the setup function, a first random element and a first state. The method may further include generating, via an update function and based at least in part on the public parameters generated by the setup function, a third random element and a second state. Inputs of the update function may include the first state generated by the initialization function and a second random element.

The object and advantages of the embodiments will be realized and achieved at least by the elements, features, and combinations particularly pointed out in the claims.

It is to be understood that both the foregoing general description and the following detailed description are exemplary and explanatory and are not restrictive of the claims.

BRIEF DESCRIPTION OF THE DRAWINGS

Example embodiments will be described and explained with additional specificity and detail through the use of the accompanying drawings.

DESCRIPTION OF EMBODIMENTS

Some systems and processes may employ randomness outputs such that a group of users may trust that the randomness outputs were honestly generated. For example, some systems and processes may generate a randomness output using multiparty computations involving the group of users participating in the system or process. The users that participated in the multiparty computation may be confident that the resulting randomness output was honestly generated. Such multiparty computations may be relatively expensive to perform. Furthermore, some systems and processes may prompt relatively frequent generation of randomness outputs. For instance, systems and processes having user groups that change frequently may generate a new randomness output following each change in the group makeup such that each user in the group may be confident that the randomness output was honestly generated.

Some embodiments may include updatable random functions. The updatable random functions may facilitate confidence that an output of the updatable random functions are sufficiently random. Thus, for example, systems or processes that employ random strings, random numbers, or other random inputs may be used with confidence that the random inputs are sufficiently random.

By way of example, updatable random functions may be employed in blockchain processes, such as may be used in so-called cryptocurrency systems, digital currency systems, or the like. In some embodiments, the updatable random functions may be employed in zero-knowledge proofs on a blockchain. Blockchains with participants that may elect to leave the blockchain and join the blockchain at relatively high rates may be improved by an updatable random function relative to a random function that may not be updatable.

In some embodiments, an updatable random function may receive two inputs. If either of the inputs is sufficiently random, then the output of the updatable random function may be sufficiently random. An input may be sufficiently random if it includes an honestly generated random input. Thus, for example, the updatable random function may facilitate a shared randomness for users of a process or system that employs a random input. By way of example, updatable random functions may be employed in non-interactive zero-knowledge (NIZK) proofs, which may allow a user to prove knowledge of some witness non-interactively and may not reveal information about the witness. Alternately or additionally, updatable random functions may be employed in proof of work algorithms, which may encourage good behavior on a blockchain by aligning incentives of the users.

Shared randomness may contribute to the functionality of systems and processes that employ NIZK proofs. If a user has the ability to cheat and manipulate the randomness, zero-knowledge properties may not hold. Conventional systems may prompt random inputs to be computed or recomputed each time a set of users of the system or process changes. For some systems and processes, such as blockchain systems, the set of users may change frequently. Thus, for example, multiparty computations may be prompted frequently. Multiparty computations may be relatively computationally expensive, monetarily expensive, or the like. For instance, multiparty computations may slow down a network in a manner that may be difficult to mitigate monetarily, that may discourage the use of particular applications, or the like.

Frequently prompting relatively expensive multiparty computations to generate random inputs may represent a technological problem in industries such as computer and networking industries, cryptocurrency and digital currency industries, or the like or any combination thereof. For example, a system or process employing shared randomness generated by multiparty computations may be relatively expensive to run. Alternately or additionally, systems and processes may not employ shared randomness to avoid the associated expense, which may encourage the systems and processes to be relatively less secure. Updatable random functions may alternately or additionally be employed to generate shared randomness in other systems and processes, such as password-authenticated key exchanges, commitment schemes, anonymous credentials, authenticated broadcast encryption, or the like or any combination thereof.

In some embodiments, updatable random functions may be employed to solve the technical problems experienced with conventional shared randomness. For example, updatable random functions may reduce the rate at which multi-party computations are prompted, which may reduce the costs of running systems or processes that employ shared randomness, such as NIZK proofs. Alternately or additionally, updatable random functions may encourage shared randomness to be employed in systems and processes that otherwise may not employ shared randomness, which may encourage more secure systems and processes.

Embodiments will be explained with reference to the accompanying drawings.

Figure 1:
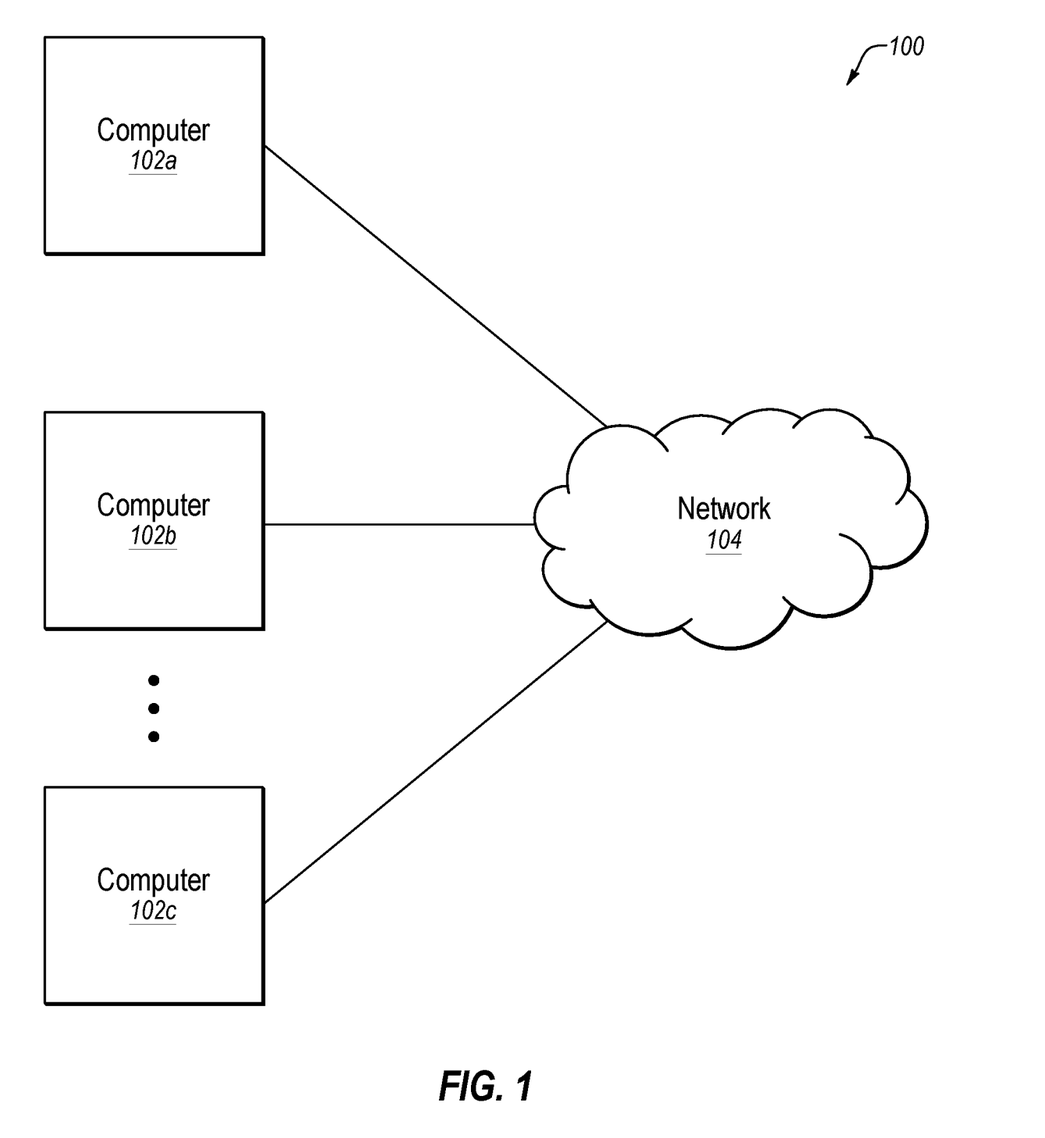
FIG. 1 illustrates a networked computer environment in which some embodiments may be employed.

FIG. 1 illustrates a networked computer environment 100 in which some embodiments may be employed. The environment 100 may include multiple computers, including computer 102a, computer 102b, and computer 102c (collectively "computers 102"). As indicated by the ellipsis, the group of computers 102 may include additional computers. The computers 102 may communicate over a network 104 and may form a group for performing some function.

In some configurations, the computers 102 may be configured to maintain a block chain for a cryptocurrency, such as a Bitcoin block chain. The block chain may represent a shared public ledger that makes available a list of confirmed transactions. The block chain may be hosted by the computers 102. Transfers of cryptocurrency may be made between two or more accounts. In some instances, the accounts may be associated with one or more of the computers 102, or with other computers or devices. The computers 102 may confirm the transfers of cryptocurrency using cryptographic rules that generally permit the computers 102 to verify the transfers of cryptocurrency and to discourage alterations of previous transfers recorded in the block chain.

Randomness outputs may be employed in maintaining the block chain. In some instances, the randomness outputs may be generated in a manner that permits the computers 102 to confirm that the randomness outputs are honestly generated. New randomness outputs may be generated whenever the makeup of the group of the computers 102 changes. For example, a new randomness output may be generated whenever a new computer, such as the computer 102c, joins the group. Conventionally, each of the computers 102 in a group would communicate via the network 104 and would participate computationally to generate an initial randomness output and to generate new randomness outputs. Furthermore, the number of communications exchanged among the computers 102 when generating a conventional randomness output may scale logarithmically with the number of computers 102 in the group.

In some embodiments, the computers 102 may employ an updatable random function to generate an initial randomness output and to generate new randomness outputs (also described herein as updating the randomness output). The randomness output may be updated in response to a change in the makeup of the group of the computers 102. In some embodiments, the randomness output may be updated in response to a computer joining the group, but may not be updated in response to a computer leaving the group. Updating the randomness output may be relatively less expensive than generating a new randomness output through conventional multiparty computations. In this and other embodiments, the updatable random function may not employ multiparty computations to generate an initial randomness output. Alternately or additionally, one or more of the computers 102 may update the randomness output while other computers in the group may not be in communication via the network 104. In some configurations, the computer updating the randomness output may communicate to the other computers in the group that the randomness output is updated via one communication.

In some configurations, shared, public randomness may be employed in multiple cryptographic applications on cryptocurrency blockchains. For example, shared, public randomness may be employed by zero-knowledge proofs and succinct non-interactive arguments of knowledge (SNARKs), which may be employed to securely build private and confidential transactions on the cryptocurrency blockchains. If a party or a group of parties may be able to unduly influence the randomness, security guarantees associated with zero-knowledge proofs and SNARKs may be off, and the processes may not be secure. Some embodiments may generate shared, public randomness in a secure manner.

Figure 2:
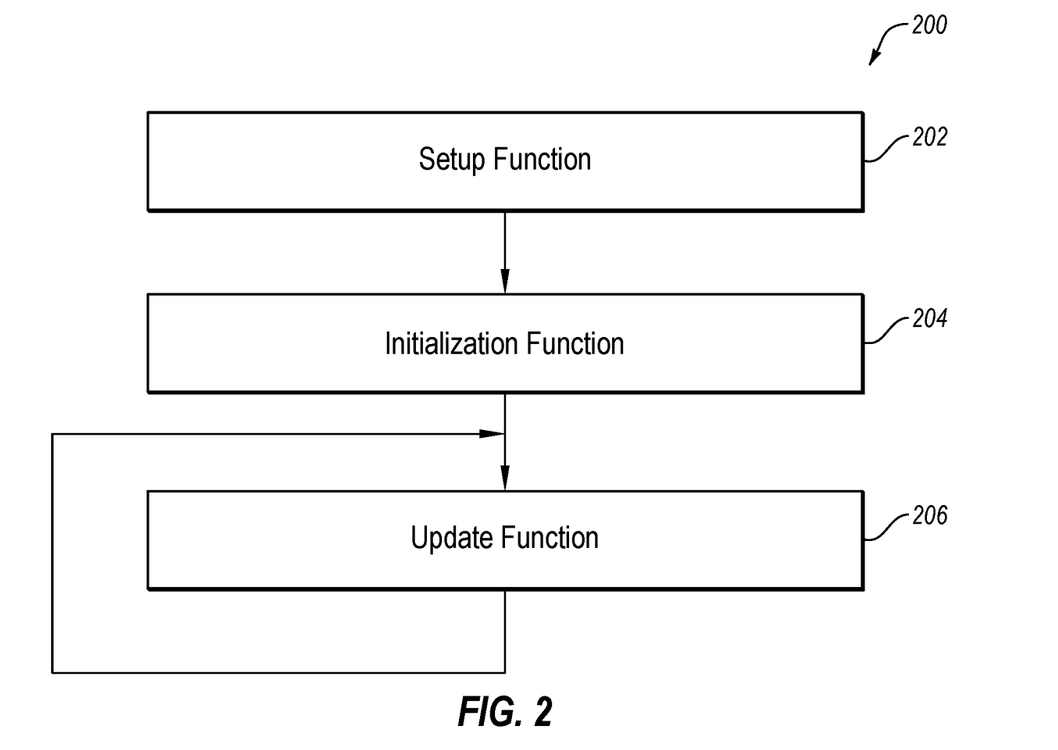
FIG. 2 illustrates a flowchart of an example updatable random function.

FIG. 2 illustrates a flowchart 200 of an example updatable random function. In some embodiments, the updatable random function may include a setup function, an initialize function, and an update function. The flowchart 200 may begin at block 202, where the updatable random function may perform the setup function. The setup function may include the following definition:

$$\text{Setup} := 1^{80} \rightarrow PP$$

Where PP may represent public parameters and λ may represent a security parameter. The public parameters may be selected based on a desired level of security. The setup function may include an algorithm setup open to public inspection. Thus, for example, users may be assured that the algorithm setup may not include exploitable functions or trapdoors.

The flowchart 200 may continue to block 204, where the updatable random function may perform the initialization function. The initialize function may include the following definition:

$$\text{Initialize} := PP \rightarrow X_1 \times S$$

Where $X_1$ may represent a first domain and S may represent a state domain. The initialize function may output a random element, represented by $x_1$, in the $X_1$ domain as well as a state, represented by s, in the S domain. For example, the initialize function may be represented as follows:

$$\text{Initialize}_{PP}(\ ) \rightarrow s, x_1$$

The flowchart 200 may continue to block 206, where the updatable random function may perform the update function. The update function may include the following definition:

$$\text{Update} := PP \times S \times X_2 \rightarrow X_1 \times S$$

Where $X_2$ may represent a second domain. The update function may take as input the public parameters, represented by PP, the current state output by the initialize function, represented by s, and a new element, represented by x2, in the X2 domain. The update function may output a new random element, again represented by $x_1$, in the $X_1$ domain and a new state, again represented by s, in the S domain. For example, the update function may be represented as follows:

$$\text{Update}_{PP}(s,x_2) \rightarrow s,x_1$$

In some embodiments, a property of the update function may include the case that a new random element output by the update function may be distributed statistically close to uniform in $X_1$ when s is an arbitrary but valid state in the domain S and $x_2$ is sampled uniformly at random in the domain $X_2$.

Alternately or additionally, a property of the update function may include the case that an efficient adversary, when given PP and s, may not find some $x_2$ in the domain $X_2$ faster than may be achieved by querying a truly random function on an oracle replacing $\text{Update}_{PP}(s,\bullet)$. For example, s may be an honestly chosen state, e.g., a state corresponding to a uniformly random output, in the domain S. Furthermore, T may represent some set of elements over the domain $X_1$ such that membership in T may be efficiently testable. The update function may include the property that the efficient adversary may not find some $x_2$ in the domain $X_2$ such that $\text{Update}_{PP}(s,x_2) \rightarrow x_1$, where $x_1$ is in the domain T.

In some embodiments, the flowchart 200 may return to block 206 to further perform the update function and to generate further new random elements, which may likewise be represented by $x_1$ in the domain $X_1$. Thus, for example, a new random element may be generated as desired. For instance, a new random element may be generated by the group of computers 102 of FIG. 1 in response to a change in the makeup of the group of the computers 102.

Figure 3A:
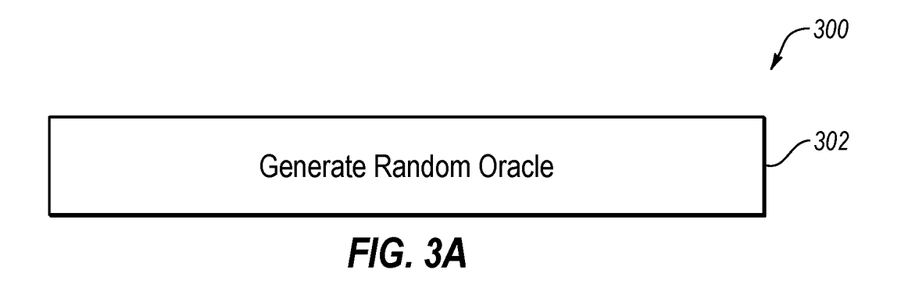
FIG. 3A illustrates a setup process for an example random oracle-type updatable random function.
Figure 3B:
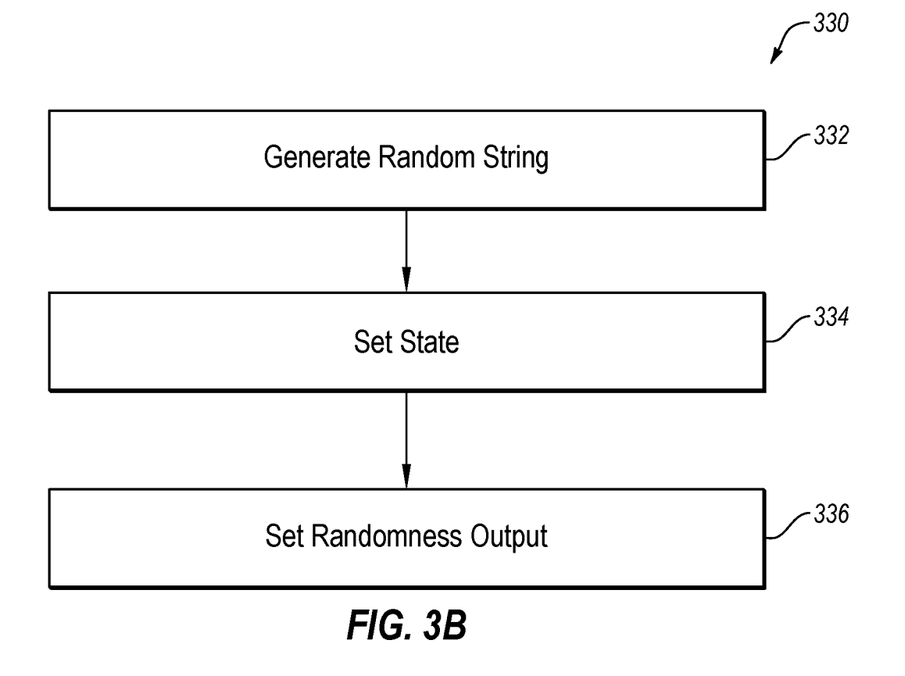
FIG. 3B illustrates an initialization process for the example random oracle-type updatable random function.
Figure 3C:
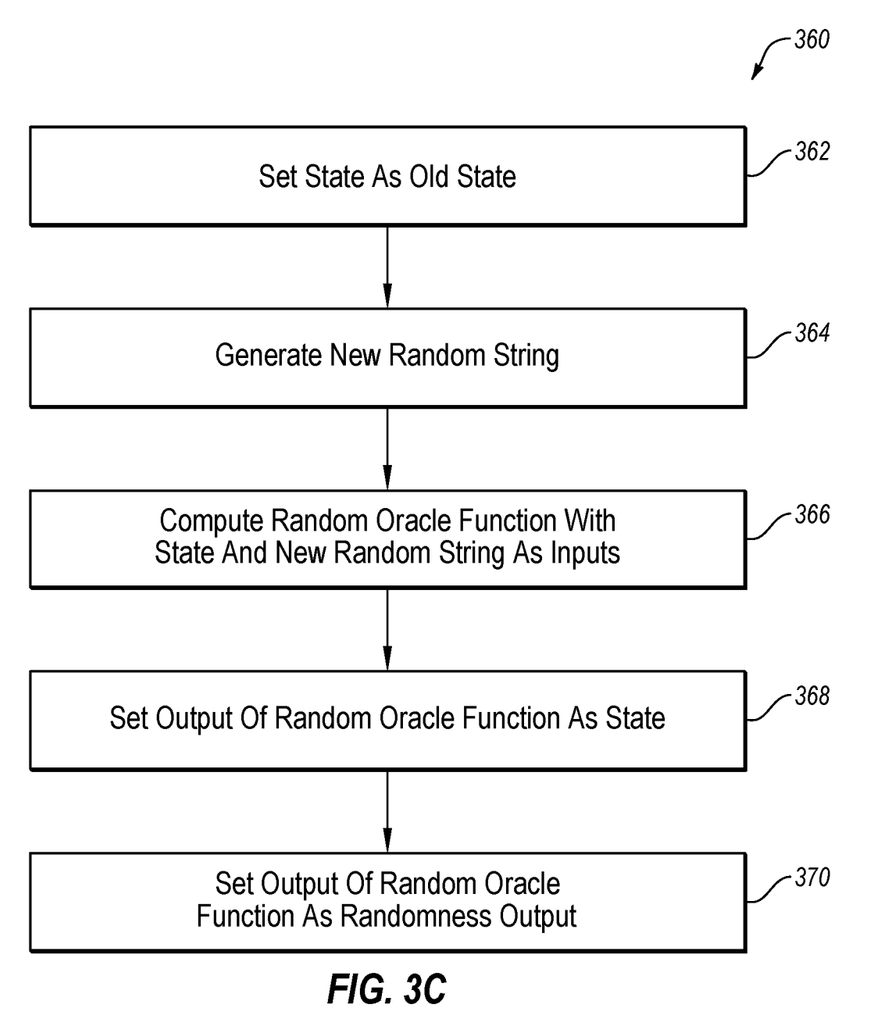
FIG. 3C illustrates an update process for the example random oracle-type updatable random function.

FIG. 3A illustrates a setup process 300 for an example random oracle-type updatable random function. FIG. 3B illustrates an initialization process 330 for the example random oracle-type updatable random function. FIG. 3C illustrates an update process 360 for the example random oracle-type updatable random function.

With reference to FIG. 3A, the setup process 300 may begin at block 302, where a random oracle, represented by H( ), may be generated. The random oracle may be defined as follows:

$$H:=\{0,1\}^l \times \{0,1\}^l \rightarrow \{0,1\}^l$$

Where l may represent an input/output length. For example, l may represent a length in bits of the two inputs and the output to the random oracle, H.

With reference to FIG. 3B, the initialization process 330 may begin at block 332, where a random string may be generated. The random string may be represented by r and may be in the domain $\{0,1\}^l$.

The initialization process 330 may continue at block 334, where a state may be set. In some embodiments, the random string may be set as the state. The state may be represented by s.

The initialization process 330 may continue at block 336, where a randomness output may be set. In some embodiments, random string may be set as the randomness output. The randomness output may be represented by $x_1$.

With reference to FIG. 3C, the update process 360 may begin at block 362, where the state, s, may be set as an old state. The update process may continue at block 364, where a new random string may be generated. The new random string may be represented by $x_2$ and may be in the domain $\{0,1\}^l$.

The update process 360 may continue at block 366, where the state and the new random string may be input into the random oracle function to compute a result, which may be represented by $H(s,x_2)$.

The update process 360 may continue at block 368, where $H(s,x_2)$ may be set as the state, s.

The update process 360 may continue at block 370, where $H(s,x_2)$ may further be set as the randomness output, $x_1$.

For this and other processes and methods disclosed herein, the functions performed in the processes and methods may be implemented in differing order. Furthermore, the outlined operations are provided only as examples, and some of the operations may be optional, combined into fewer operations, or expanded into additional operations without detracting from the essence of the embodiments.

Figure 4A:
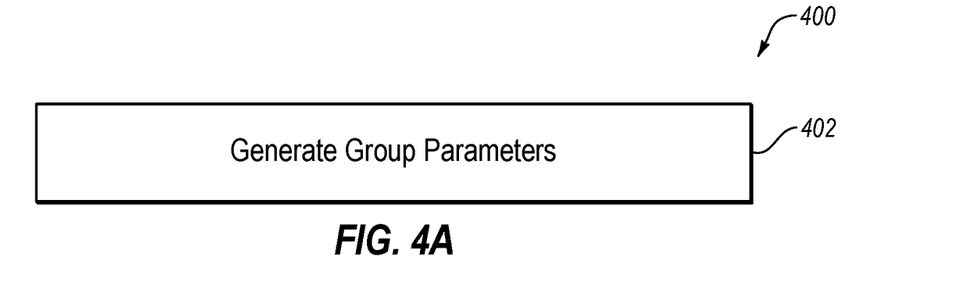
FIG. 4A illustrates a setup process for an example random oracle-type updatable random function.
Figure 4B:
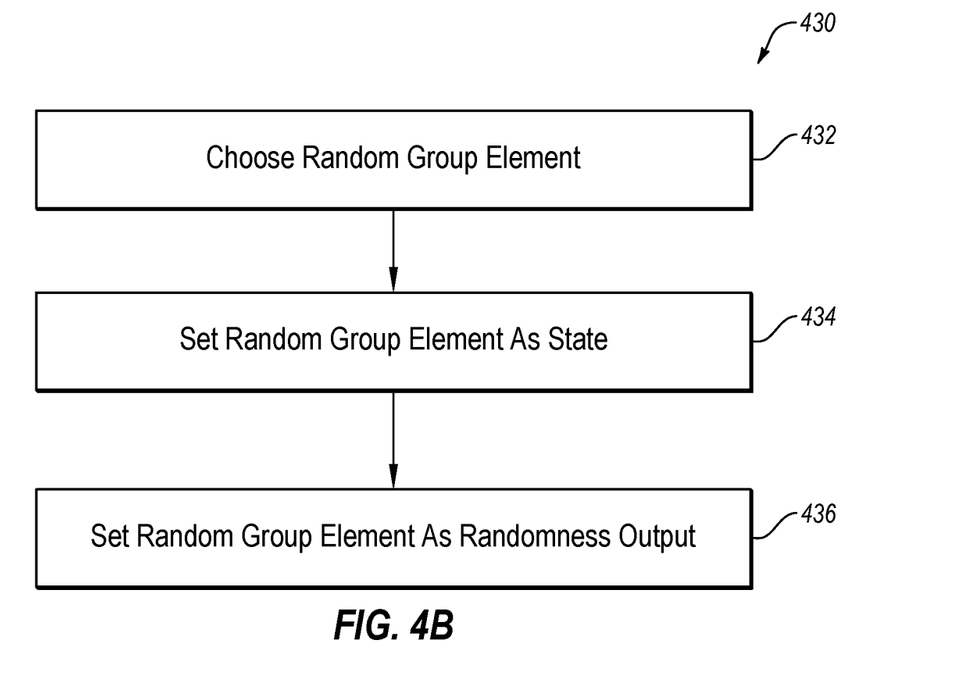
FIG. 4B illustrates an initialization process for the example random oracle-type updatable random function.
Figure 4C:
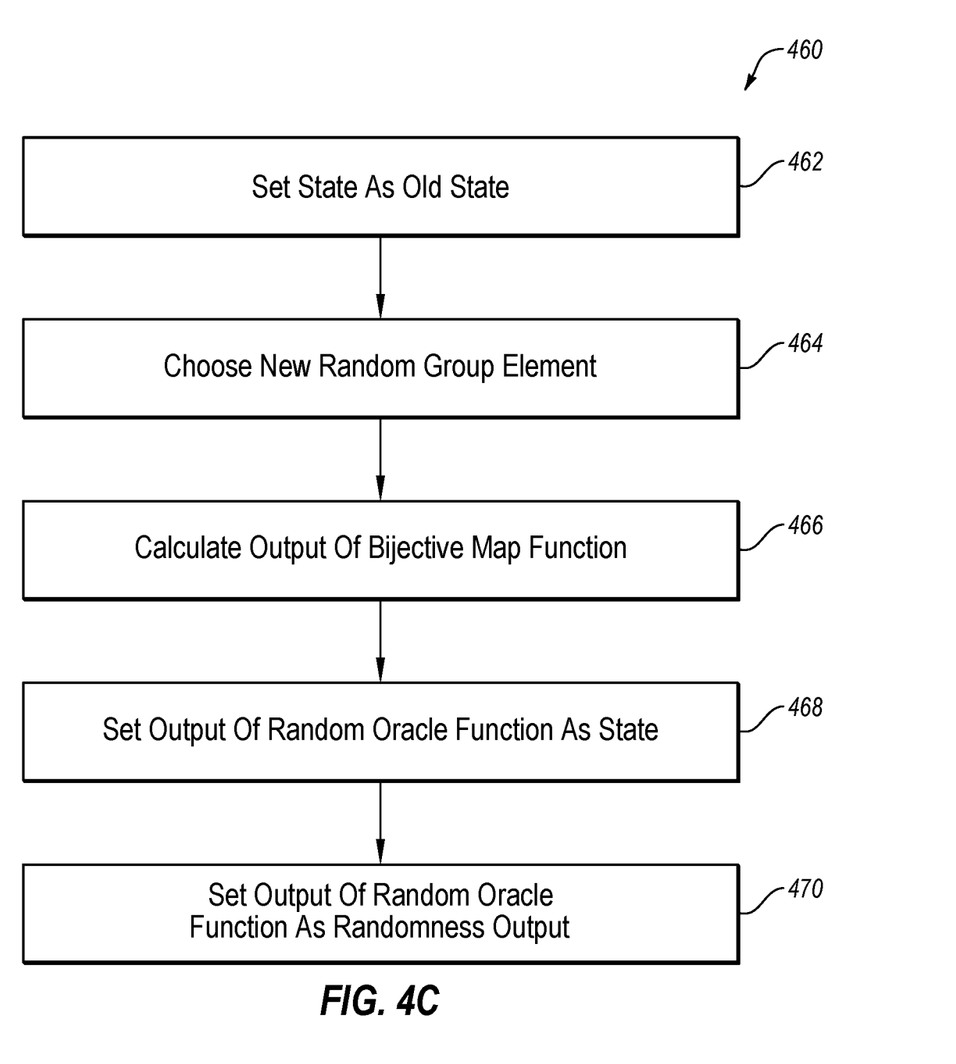
FIG. 4C illustrates an update process for the example random oracle-type updatable random function.

FIG. 4A illustrates a setup process 400 for an example random oracle-type updatable random function. FIG. 4B illustrates an initialization process 430 for the example random oracle-type updatable random function. FIG. 4C illustrates an update process 460 for the example random oracle-type updatable random function.

With reference to FIG. 4A, the setup process 400 may begin at block 402, where group parameters may be generated. The group parameters may include $G_1, G_2, G_T, g_1, g_2, g_T, e( )$ and $f( )$. In some embodiments, $G_1, G_2,$ and $G_T$ may be groups of the same order. Alternately or additionally, $g_1$ may be in the group $G_1, g_2$ may be in the group $G_2,$ and $g_T$ may be in the group $G_T$. The function $e( )$ may be an efficiently computable bilinear map and may be defined as follows:

$$e:=G_1 \times G_2 \rightarrow G_T$$

The function $f( )$ may be an efficiently computable bijective map and may be defined as follows:

$$f:=G_T \rightarrow G_1$$

In some embodiments, $g_1, g_2,$ and $g_T$ may be generators and may include the following property:

$$e(g_1,g_2)=g_T$$

With reference to FIG. 4B, the initialization process 430 may begin at block 432, where a random group element, which may be represented by g, may be chosen. The random group element, g, may be in the group $G_1$.

The initialization process 430 may continue at block 434, where g may be set as a state, which may be represented as s.

The initialization process 430 may continue at block 436, where g may further be set as a randomness output, which may be represented as $x_1$. Thus, for example, the initialization process 430 may generate a randomness output, $x_1$, and a state, s, which each may be equal to a generator, $g_1$, in a group, $G_1$.

With reference to FIG. 4C, the update process 460 may begin at block 462, where the state, s, may be set as an old state. The update process 460 may continue at block 464, where a new random element may be chosen. The new random element may be represented by g' and may be in the group $G_2$.

The update process 460 may continue at block 466, where the function $e( )$ may be calculated with the state, s, and the new random element, g', and the function $f( )$ may be calculated using the result as the input. Put another way, an output, which may be described as an output of the bijective map functions and represented by y, may be calculated according to the following expression:

$$y=f(e(s,g'))$$

The update process 460 may continue at block 468, where the output, y, may be set as a new state, which may be represented by s'.

The update process 460 may continue at block 470, where the output, y, may be set as a randomness output, which may be represented by $x_1$.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In some embodiments, the different systems and processes described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated.

All examples and conditional language recited herein are intended for pedagogical objects to aid the reader in understanding the embodiments and the concepts contributed to furthering the art, and are to be construed as being without limitation to such specifically recited examples and conditions. Although embodiments have been described in detail, it should be understood that the various changes, substitutions, and alterations could be made hereto without departing from the scope of the embodiments.

What is claimed is:

1. A method comprising:
   generating public parameters associated with a random updatable function;
   generating, based at least in part on the public parameters, an initial randomness output that includes a first random element and a first state, wherein the initial randomness output is used by a plurality of computers in zero-knowledge proofs in building of a blockchain; and
   generating, without multiparty computation by a plurality of computers, a new randomness output that includes a third random element and a second state, wherein the third random element is generated based at least in part on the public parameters, the first state of the initial randomness output, and a second random element, and wherein the new randomness output is used by the plurality of computers in the zero-knowledge proofs in building the blockchain.

2. The method of claim 1, wherein the generating the public parameters includes generating a random oracle configured to generate a random string output based at least in part on two input strings.

3. The method of claim 2, further comprising generating a first random string and assigning a value of the first random string to the first random element and to the first state.

4. The method of claim 3, further comprising:
   generating a second random string;
   assigning a value of the second random string to the second random element; and
   assigning an output of the random oracle to the third random element and to the second state, wherein inputs of the random oracle include the first state and the second random element.

5. The method of claim 1, wherein the generating the public parameters includes generating a first generator associated with a first group, a second generator associated with a second group, a third generator associated with a third group, the method further comprising:
   outputting the third random element based at least in part on inputs of the first generator and the second generator; and
   outputting the first generator based at least in part on an input of the third generator.

6. The method of claim 5, further comprising:
   choosing a first random group element associated with the first group; and
   assigning a value of the first random group element to the first state and to the first random element.

7. The method of claim 6, further comprising:
   choosing a second random group element associated with the second group; and
   assigning a value of an output of a bijective map function to a second state and to a second random element, wherein the bijective map function includes an output of a bilinear map function as an input, and wherein the bilinear map function includes the first state and the second random group elements as inputs.

8. A non-transitory computer readable medium configured to cause a system to perform operations of a random updatable function, the operations comprising:
   generating public parameters associated with a random updatable function;
   generating, based at least in part on the public parameters, an initial randomness output that includes a first random element and a first state, wherein the initial randomness output is used by a plurality of computers in zero-knowledge proofs in building of a blockchain; and
   generating, without multiparty computation by a plurality of computers, a new randomness output that includes a third random element and a second state, wherein the third random element is generated based at least in part on the public parameters, the first state of the initial randomness output, and a second random element, and wherein the new randomness output is used by the plurality of computers in the zero-knowledge proofs in building the blockchain.

9. The non-transitory computer readable medium of claim 8, wherein the generating the public parameters includes generating a random oracle configured to generate a random string output based at least in part on two input strings.

10. The non-transitory computer readable medium of claim 9, the operations further comprising generating a first random string and assigning a value of the first random string to the first random element and to the first state.

11. The non-transitory computer readable medium of claim 10, the operations further comprising:
generating a second random string;
assigning a value of the second random string to the second random element; and
assigning an output of the random oracle to the third random element and to the second state, wherein inputs of the random oracle include the first state and the second random element.

12. The non-transitory computer readable medium of claim 8, wherein the generating the public parameters includes generating a first generator associated with a first group, a second generator associated with a second group, a third generator associated with a third group, a bilinear map function configured to output the third random element based at least in part on inputs of the first generator and the second generator, and a bijective map function configured to output the first generator based at least in part on an input of the third generator.

13. The non-transitory computer readable medium of claim 12, the operations further comprising:
choosing a first random group element associated with the first group; and
assigning a value of the first random group element to the first state and to the first random element.

14. The non-transitory computer readable medium of claim 13, the operations further comprising:
choosing a second random group element associated with the second group; and
assigning a value of an output of the bijective map function to a second state and to a second random element, wherein the bijective map function includes an output of the bilinear map function as an input, and wherein the bilinear map function includes the first state and the second random group elements as inputs.

15. A block chain system including one or more processors and one or more non-transitory computer-readable media, the system configured to perform operations comprising:
generating public parameters associated with a random updatable function;
generating, based at least in part on the public parameters, an initial randomness output that includes a first random element and a first state, wherein the initial randomness output is used by a plurality of computers in zero-knowledge proofs in building of a blockchain; and
generating, without multiparty computation by a plurality of computers, a new randomness output that includes a third random element and a second state, wherein the third random element is generated based at least in part on the public parameters, the first state of the initial randomness output, and a second random element, and wherein the new randomness output is used by the plurality of computers in the zero-knowledge proofs in building the blockchain.

16. The block chain system of claim 15, wherein the public parameters include a random oracle configured to generate a random string output based at least in part on two input strings.

17. The block chain system of claim 16, the operations further comprising generating a first random string and to assign a value of the first random string to the first random element and to the first state.

18. The block chain system of claim 17, the operations further comprising generating a second random string and to assign a value of the second random string to the second random element, and to assign an output of the random oracle to the third random element and to the second state, wherein inputs of the random oracle include the first state and the second random element.

19. The block chain system of claim 15, wherein the public parameters include a first generator associated with a first group, a second generator associated with a second group, a third generator associated with a third group, a bilinear map function configured to output the third random element based at least in part on inputs of the first generator and the second generator, and a bijective map function configured to output the first generator based at least in part on an input of the third generator.

20. The block chain system of claim 19, the operations further comprising:
choosing a first random group element associated with the first group;
assigning a value of the first random group element to the first state and to the first random element; choosing a second random group element associated with the second group; and
assigning a value of the bijective map function to a second state and to a second random element, wherein the bijective map function includes an output of the bilinear map function as an input, and wherein the bilinear map function includes the first state and the second random group elements as inputs.

* * * * *